United States Patent
Gorman et al.

(10) Patent No.: US 8,777,627 B2
(45) Date of Patent: Jul. 15, 2014

(54) HAZARDOUS MATERIAL RESPONSE SYSTEM, METHOD OF USING SAME AND METHOD OF TRAINING FOR SAME

(71) Applicants: Joseph Gorman, Winchester, VA (US); Cristobal Aguirre, Miami, FL (US)

(72) Inventors: Joseph Gorman, Winchester, VA (US); Cristobal Aguirre, Miami, FL (US)

(73) Assignee: Federal Resources Supply Company, Stevensville, MD (US)

( * ) Notice: Subject to any disclaimer, the term of this patent is extended or adjusted under 35 U.S.C. 154(b) by 0 days.

(21) Appl. No.: 13/752,253

(22) Filed: Jan. 28, 2013

(65) Prior Publication Data
US 2013/0209975 A1    Aug. 15, 2013

Related U.S. Application Data

(62) Division of application No. 12/349,384, filed on Jan. 6, 2009, now Pat. No. 8,360,781.

(60) Provisional application No. 61/088,658, filed on Aug. 13, 2008.

(51) Int. Cl.
*G09B 19/00*    (2006.01)

(52) U.S. Cl.
USPC .......................................................... 434/219

(58) Field of Classification Search
USPC .......... 434/218, 219, 226, 276, 281, 282, 298
See application file for complete search history.

(56) References Cited

U.S. PATENT DOCUMENTS

| | | | | |
|---|---|---|---|---|
| 5,537,752 A * | 7/1996 | Cornwell et al. | ............. | 33/1 SB |
| 5,644,693 A * | 7/1997 | Fitzgerald et al. | ............ | 715/835 |
| 6,027,344 A * | 2/2000 | Johanns et al. | ............... | 434/219 |
| 6,033,225 A * | 3/2000 | Pike | ............... | 434/218 |
| 6,839,609 B2 * | 1/2005 | Rice, Jr. | ....................... | 700/227 |
| 7,684,966 B1 * | 3/2010 | Genovese | ......................... | 703/6 |
| 7,933,879 B2 * | 4/2011 | Ouzounian | ................... | 707/694 |
| 2004/0204790 A1 * | 10/2004 | Rice, Jr. | ....................... | 700/227 |
| 2004/0224293 A1 * | 11/2004 | Penning et al. | ................. | 434/219 |
| 2005/0147949 A1 * | 7/2005 | Wilson | ........................... | 434/219 |
| 2008/0071396 A1 * | 3/2008 | Quandel et al. | ................. | 700/49 |
| 2008/0221965 A1 * | 9/2008 | Riddle | ................ | 705/9 |
| 2009/0125460 A1 * | 5/2009 | Hewison et al. | ................ | 706/11 |

* cited by examiner

*Primary Examiner* — Kurt Fernstrom
(74) *Attorney, Agent, or Firm* — Mintz Levin Cohn Ferris Glovsky and Popeo, P.C.

(57) ABSTRACT

This application describes methods for responding to a hazardous material based upon its properties and/or its chemical name. This application also describes methods of teaching hazardous material responders how to use the method of responding to a hazardous material based upon its properties and/or its chemical name.

6 Claims, 6 Drawing Sheets

RESEARCH FORM

CHEMICAL NAME: ☐ Above ☐ Below

Properties

Vapor Pressure:

Flash Point:

LEL - UEL:

Corrosivity:

Molecular Weight:

Solubility

Ionizing Potential:

Polymerization:

HEALTH

TWA - PEL REL:

Exposure Routes:

REACTIVITIES

Peroxide Formation:

METERS

| | |
|---|---|
| CGI: | PID: |
| Halogen Meter: | FID: |
| pH / KI paper: | Temp. Gun: |
| Colormeteric Tubes or Chips: | Radiological: |

PPE

| Level A | Level B | Turn Out with SCBA |
|---|---|---|
| ALWAYS BELOW LEL | ALWAYS BELOW LEL | ALWAYS BELOW LEL |
| Corrosive gas | Solid or liquid | Solid, liquid or |
| and / or | | gases that are |
| Skin-absorbable gas | | not skin-absorbable or corrosive |

Fig. 6

HAZARDOUS MATERIAL RESPONSE SYSTEM, METHOD OF USING SAME AND METHOD OF TRAINING FOR SAME

CROSS-REFERENCE TO RELATED APPLICATIONS

The present patent application is a divisional of U.S. patent application Ser. No. 12/349,384, filed on Jan. 6, 2009, now U.S. Pat. No. 8,360,781 and entitled "HAZARDOUS MATERIAL RESPONSE SYSTEM, METHOD OF USING SAME AND METHOD OF TRAINING FOR SAME," which claims the benefit of U.S. Provisional Patent Application Ser. No. 61/088,658, filed on Aug. 13, 2008 and entitled "HAZARDOUS MATERIAL RESPONSE SYSTEM, METHOD OF USING SAME AND METHOD OF TRAINING FOR SAME," the disclosure of which are incorporated by reference herein in their entireties.

BACKGROUND OF THE INVENTION

First responders must make rapid decisions in life-saving and life-threatening situations when dealing with hazardous materials that have been improperly released into the environment. This is especially true now with the threat of international terrorism. Prior to dealing with an actual terrorist or other incident involving suspected or known chemical hazards, emergency personnel must be adequately trained to properly react to the various types of hazardous events, for both their safety as well as public safety.

Given this, responders must rapidly process information during a hazardous incident and make the appropriate decisions for action based upon his own cognitive abilities to mentally process such information with or without the help of additional resources. Although training manuals and field manuals may be available, timely access and processing of this information remains elusive, and decisions made on this less-than-optimal information may prove detrimental. The known detection methods give the responder a variety of information, however, it is important for the responder to understand what he or she is using and why. Further, it is important for the responder to quickly and efficiently conduct the risk assessment of a hazardous incident in minutes.

Hazardous Material (HazMat) Responders experience "information overload" that often results in responders over analyzing available research material causing incidents to be time-consuming, extremely costly, and labor intensive. Implementing change in existing methods to make efficient risk based decisions on virtually any known or unknown chemical incident in minutes creates tremendous opportunities and dramatic challenges, often concurrently. There exists a need in the art for novel methods of quick risk assessment of chemical incident in civil and combat situations. There is a need to integrate the required functional elements in order to respond adequately to a terrorist threat or chemical incident involving suspected or known or unknown chemical hazards.

The description herein of disadvantages and problems associated with known methods is in no way intended to limit the scope of the embodiments described in this document to their exclusion. Indeed, certain embodiments may include one or more known methods or method steps without suffering from the so-noted disadvantages or problems.

SUMMARY OF THE INVENTION

It is an object of the present invention to provide a method of rapid risk assessment of virtually any substance involved in a hazardous material emergency based entirely on its name. The instant specification discloses techniques that allow for the rapid classification of hazardous materials in order to enable safe and efficient risk based response to a hazardous material emergency. The invention also provides techniques that give rapid risk assessment of unknown chemicals by employing the same system, but in reverse order.

It is an object of the present invention to provide a method of training a user to respond to a hazardous material emergency comprising providing in a fixed medium a representation separating two or more chemicals on the periodic chart into a first group or a second group, wherein the first group of elements are chemical constituents of hazardous materials that possess one or more of the following properties: solid, not flammable, no lower explosive limit (LEL), no upper explosive limit (UEL), no flashpoint, no ionizing potential, when mixed with water they create a corrosive solution, the solution is basic, (pH paper turns blue when exposed to the chemical in solution), initial isolation distance for the material is 75 feet, the exposure limits unit of measurements are mg/m$^3$; and wherein the second group of elements are chemical constituents of hazardous materials that possess one or more of the following properties: solid, liquid or gas, flammable, possess a LEL, posses an UEL, have a flashpoint, have ionizing potential, acidic (pH paper turns red when exposed to the chemical in solution), exposure limits unit of measurements are in parts per million PPM; and directing the user to rapid risk assessment of the hazardous material depending on the classification of the substance into the first group or the second group. The first group of chemicals have a first name that is selected from the following: lithium, sodium, potassium, rubidium, cesium, beryllium, magnesium, calcium, strontium, barium, scandium, yttrium, lanthanum, titanium, zirconium, hafnium, vanadium, nobelium, tantalum, chromium, molybdenum, tungsten, manganese, technetium, rhenium, iron, ruthenium, osmium, cobalt, rhodium, iridium, nickel, palladium, platinum, copper, silver, gold, zinc, cadmium, mercury, aluminum, gallium, indium, thallium, germanium, tin, lead, antimony, bismuth, and polonium. The first group may further comprise chemicals with second names selected from: nitride, phosphide, carbide, and hydride. Chemicals not in the first group are in the second group. The second group of chemicals also include those that have a first name that is selected from the following: hydrogen, boron, carbon, silicon, nitrogen, phosphorus, arsenic, oxygen, sulfur, selenium, tellurium, fluorine, chlorine, bromine, iodine, astatine, helium, neon, argon, krypton, xenon, and radon. The first group is also referred to, herein, as substances that are "below the line" and the second group is also referred to, herein, as substances that are "above the line". The significance of these terms is explained in greater detail below.

It is an object of the present invention to provide a method of responding to a hazardous material emergency comprising providing in a fixed medium a representation separating chemicals of a first group from chemicals of a second group. For example, according to some embodiments, a method of responding to a hazardous material emergency is provided that comprises providing in a fixed medium a representation separating two or more elements selected from the group consisting of lithium, sodium, potassium, rubidium, cesium, beryllium, magnesium, calcium, strontium, barium, scandium, yttrium, lanthanum, titanium, zirconium, hafnium, vanadium, nobelium, tantalum, chromium, molybdenum, tungsten, manganese, technetium, rhenium, iron, ruthenium, osmium, cobalt, rhodium, iridium, nickel, palladium, platinum, copper, silver, gold, zinc, cadmium, mercury, aluminum, gallium, indium, thallium, germanium, tin, lead, antimony, bismuth, and polonium and/or two or more moieties selected from the group consisting of nitride, carbide, hydride, and phosphide into a first group, and two or more elements selected from the group consisting of hydrogen, boron, carbon, silicon, nitrogen, phosphorus, arsenic, oxygen, sulfur, selenium, tellurium, fluorine, chlorine, bromine, iodine, astatine, helium, neon, argon, krypton, xenon, and radon into a second group.

According to some embodiments, the method further comprises analyzing the name of a hazardous material to determine whether a first word in the name of the hazardous material is an element recited in the first group, or whether a second word in the name of the hazardous material is a chemical moiety recited in the first group, or whether the first word in the name of the hazardous material is an element recited in the second group.

According to some embodiments, the methods of the present invention further directs a hazardous material responder to respond to the hazardous material according to a first method when the first word of the name of the hazardous material is an element recited in the first group or the second name is a chemical moiety recited in the first group.

According to some embodiments, the method of the present invention directs the hazardous material responder to respond to the hazardous material according to a second method when the first word of the name of the hazardous material is not an element recited in the first group, or when the second name of the hazardous material is not a chemical moiety recited in the first group, or when the first name of the hazardous material is an element recited in the second group.

In one preferred embodiment, the method of responding to a hazardous material emergency involves the use of a fixed medium that is a periodic chart of the elements in which a marking is made separating elements lithium, sodium, potassium, rubidium, cesium, beryllium, magnesium, calcium, strontium, barium, scandium, yttrium, lanthanum, titanium, zirconium, hafnium, vanadium, nobelium, tantalum, chromium, molybdenum, tungsten, manganese, technetium, rhenium, iron, ruthenium, osmium, cobalt, rhodium, iridium, nickel, palladium, platinum, copper, silver, gold, zinc, cadmium, mercury, aluminum, gallium, indium, thallium, germanium, tin, lead, antimony, bismuth, and polonium from hydrogen, boron, carbon, silicon, nitrogen, phosphorus, arsenic, oxygen, sulfur, selenium, tellurium, fluorine, chlorine, bromine, iodine, astatine, helium, neon, argon, krypton, xenon, and radon.

In another preferred embodiment, the fixed medium includes a list of elements consisting of at least five members of the group consisting of lithium, sodium, potassium, rubidium, cesium, beryllium, magnesium, calcium, strontium, barium, scandium, yttrium, lanthanum, titanium, zirconium, hafnium, vanadium, nobelium, tantalum, chromium, molybdenum, tungsten, manganese, technetium, rhenium, iron, ruthenium, osmium, cobalt, rhodium, iridium, nickel, palladium, platinum, copper, silver, gold, zinc, cadmium, mercury, aluminum, gallium, indium, thallium, germanium, tin, lead, antimony, bismuth, and polonium.

In a further preferred embodiment, the fixed medium includes a list of elements consisting of at least ten members of the group consisting of lithium, sodium, potassium, rubidium, cesium, beryllium, magnesium, calcium, strontium, barium, scandium, yttrium, lanthanum, titanium, zirconium, hafnium, vanadium, nobelium, tantalum, chromium, molybdenum, tungsten, manganese, technetium, rhenium, iron, ruthenium, osmium, cobalt, rhodium, iridium, nickel, palladium, platinum, copper, silver, gold, zinc, cadmium, mercury, aluminum, gallium, indium, thallium, germanium, tin, lead, antimony, bismuth, and polonium.

In yet another preferred embodiment, the fixed medium comprises a list of elements consisting of at least twenty members of the group consisting of lithium, sodium, potassium, rubidium, cesium, beryllium, magnesium, calcium, strontium, barium, scandium, yttrium, lanthanum, titanium, zirconium, hafnium, vanadium, nobelium, tantalum, chromium, molybdenum, tungsten, manganese, technetium, rhenium, iron, ruthenium, osmium, cobalt, rhodium, iridium, nickel, palladium, platinum, copper, silver, gold, zinc, cadmium, mercury, aluminum, gallium, indium, thallium, germanium, tin, lead, antimony, bismuth, and polonium.

In one embodiment, the method of responding to a hazardous material emergency comprises a representation separating elements selected from the group consisting of lithium, sodium, potassium, rubidium, cesium, beryllium, magnesium, calcium, strontium, barium, scandium, yttrium, lanthanum, titanium, zirconium, hafnium, vanadium, nobelium, tantalum, chromium, molybdenum, tungsten, manganese, technetium, rhenium, iron, ruthenium, osmium, cobalt, rhodium, iridium, nickel, palladium, platinum, copper, silver, gold, zinc, cadmium, mercury, aluminum, gallium, indium, thallium, germanium, tin, lead, antimony, bismuth, and polonium, and moieties selected from the group consisting of nitride, carbide, hydride and phosphide into a first group, and elements selected from the group consisting of hydrogen, boron, carbon, silicon, nitrogen, phosphorus, arsenic, oxygen, sulfur, selenium, tellurium, fluorine, chlorine, bromine, iodine, astatine, helium, neon, argon, krypton, xenon, and radon into a second group.

In one preferred embodiment, the representation separates five or more elements selected from the group consisting of lithium, sodium, potassium, rubidium, cesium, beryllium, magnesium, calcium, strontium, barium, scandium, yttrium, lanthanum, titanium, zirconium, hafnium, vanadium, nobelium, tantalum, chromium, molybdenum, tungsten, manganese, technetium, rhenium, iron, ruthenium, osmium, cobalt, rhodium, iridium, nickel, palladium, platinum, copper, silver, gold, zinc, cadmium, mercury, aluminum, gallium, indium, thallium, germanium, tin, lead, antimony, bismuth, and polonium, and/or two or more moieties selected from the group consisting of nitride, carbide, hydride, and phosphide into a first group, and five or more elements selected from the group consisting of hydrogen, boron, carbon, silicon, nitrogen, phosphorus, arsenic, oxygen, sulfur, selenium, tellurium, fluorine, chlorine, bromine, iodine, astatine, helium, neon, argon, krypton, xenon, and radon into a second group.

In another preferred embodiment, the representation separates ten or more elements selected from the group consisting of lithium, sodium, potassium, rubidium, cesium, beryllium, magnesium, calcium, strontium, barium, scandium, yttrium, lanthanum, titanium, zirconium, hafnium, vanadium, nobelium, tantalum, chromium, molybdenum, tungsten, manganese, technetium, rhenium, iron, ruthenium, osmium, cobalt, rhodium, iridium, nickel, palladium, platinum, copper, silver, gold, zinc, cadmium, mercury, aluminum, gallium, indium, thallium, germanium, tin, lead, antimony, bismuth, and polonium, and ten or more elements selected from the group consisting of hydrogen, boron, carbon, silicon, nitrogen, phosphorus, arsenic, oxygen, sulfur, selenium, tellurium, fluorine, chlorine, bromine, iodine, astatine, helium, neon, argon, krypton, xenon, and radon into a second group.

In another preferred embodiment, a method of responding to a hazardous material emergency is provided that comprises analyzing the name of a hazardous material, and where the first word of the name of the hazardous material is an element recited in the first group, or where the second name is a chemical moiety recited in the first group, a hazardous material responder responds, or is directed to respond, to a non-flammable hazardous material. The method may also comprise analyzing the name of a hazardous material, and where the first word of the name of the hazardous material is not an element recited in the first group, or where the second name of the hazardous material is not a chemical moiety recited in the first group, or where the first name of the hazardous material is an element recited in the second group, the hazardous material responder responds, or is directed to respond, to a flammable hazardous material.

In another embodiment, a method of responding to a hazardous material emergency is provided that comprises analyzing the name of a hazardous material, and where the first word of the name of the hazardous material is an element recited in the first group or where the second name is a chemical moiety recited in the first group, a hazardous material responder responds, or is directed to respond, to a hazardous material without an upper or lower explosive level. In a further embodiment, where the first word of the name of the hazardous material is not an element recited in the first group, or where the second name of the hazardous material is not a chemical moiety recited in the first group, or where the first name of the hazardous material is an element recited in the second group, the hazardous material responder responds, or is directed to respond, to a hazardous material with an upper or lower explosive level.

In another embodiment, a method of responding to a hazardous material emergency is provided that comprises analyzing the name of a hazardous material, and where the first word of the name of the hazardous material is an element recited in the first group, or where the second name is a chemical moiety recited in the first group, a hazardous material responder responds, or is directed to respond, to a hazardous material without a flashpoint. In a further embodiment, where the first word of the name of the hazardous material is not an element recited in the first group, or where the second name of the hazardous material is not a chemical moiety recited in the first group, or where the first name of the hazardous material is an element recited in the second group, the hazardous material responder responds, or is directed to respond, to a hazardous material with a flashpoint.

In yet another embodiment, a method of responding to a hazardous material emergency is provided that comprises analyzing the name of a hazardous material, and where the first word of the name of the hazardous material is an element recited in the first group, or where the second name is a chemical moiety recited in the first group, a hazardous material responder responds, or is directed to respond, to a hazardous material without an ionization potential. In a further embodiment, where the first word of the name of the hazardous material is not an element recited in the first group, or where the second name of the hazardous material is not a chemical moiety recited in the first group, or where the first name of the hazardous material is an element recited in the second group, the hazardous material responder responds, or is directed to respond, to a hazardous material with an ionization potential.

In yet another embodiment, a method of responding to a hazardous material emergency is provided that comprises analyzing the name of a hazardous material, and where the first word of the name of the hazardous material is an element recited in the first group, or where the second name is a chemical moiety recited in the first group, a hazardous material responder responds, or is directed to respond, to a hazardous material that is a base. In a further embodiment, where the first word of the name of the hazardous material is not an element recited in the first group, or where the second name of the hazardous material is not a chemical moiety recited in the first group, or where the first name of the hazardous material is an element recited in the second group, the hazardous material responder responds, or is directed to respond, to a hazardous material that is an acid.

In another embodiment, a method of responding to a hazardous material emergency is provided that comprises analyzing the name of a hazardous material, and where the first word of the name of the hazardous material is an element recited in the first group or the second name is a chemical moiety recited in the first group, a hazardous material responder responds, or is directed to respond, to a hazardous material with exposure limits expressed in $mg/m^3$. In another embodiment, when the first word of the name of the hazardous material is not an element recited in the first group, or when the second name of the hazardous material is not a chemical moiety recited in the first group, or when the first name of the hazardous material is an element recited in the second group, the hazardous material responder responds, or is directed to respond, to a hazardous material with exposure limits expressed in ppm.

In yet another embodiment, a method of responding to a hazardous material emergency is provided that comprises analyzing the name of a hazardous material, and where the first word of the name of the hazardous material is an element recited in the first group or the second name is a chemical moiety recited in the first group, a hazardous material responder responds, or is directed to respond, to a hazardous material with an initial isolation of 75 feet if in solid form and 150 feet if in solution. In a further embodiment, where the first word of the name of the hazardous material is not an element recited in the first group, or where the second name of the hazardous material is not a chemical moiety recited in the first group, or where the first name of the hazardous material is an element recited in the second group, the hazardous material responder responds, or is directed to respond, to a hazardous material with an initial isolation of 75 feet if a solid, 150 feet if a liquid or 300 feet if a gas.

In a further embodiment, a method of responding to a hazardous material emergency of the present invention is provided, the method comprises providing in a second fixed medium a representation listing second names of hazardous materials, wherein a first word of the name of the hazardous material is an element recited in the first group or the second name is a chemical moiety recited in the first group, wherein the representation shows at least one hazard associated with the substance having each second name and appropriate detection equipment to evaluate risk associated with the hazardous material. The method further includes matching the second name of the hazardous material with the representation and employing the appropriate detection equipment on the hazardous material.

In one embodiment, the at least one property shown in the representation on the second fixed medium is selected from the group consisting of state of matter, flammability, explosive limits, flashpoint, ionizing potential, pH, exposure limit units and initial isolation.

It is yet another object of the present invention to provide a method of responding to a hazardous material emergency. According to some embodiments, the method comprises performing a test for the presence or absence of at least one physical property of the hazardous material wherein the test is selected from the group consisting of flammability, existence of explosive limits, existence of flashpoint, existence of ionizing potential, and acidic or basic pH, wherein if the test shows that the hazardous material is flammable, has explosive limits, has a flashpoint, has an ionization potential, personnel is directed to wear turn-out/SCBA or Level B personal protection equipment (PPE), and wherein if the test shows that the hazardous material is acidic, a user is directed to be equipped with Level A personal protection equipment (PPE), and wherein if the test shows that the hazardous material is not flammable, has no explosive limits, has no flashpoint, has no ionization potential or is basic, the user is directed to be equipped with turn-out/SCBA or Level B PPE.

In one embodiment, the test shows whether or not the hazardous material is flammable. In another embodiment, the test shows whether or not the hazardous material has explosive limits. In yet another embodiment, the test shows whether or not the hazardous material has a flashpoint. In yet another embodiment, the test shows whether or not the pH of the hazardous material is acidic, basic or neutral. In yet another embodiment, the test shows whether or not the hazardous material has an ionizing potential.

The present invention also provides a chart for responding to a hazardous material emergency. In one embodiment, a chart in a fixed medium shows a periodic table of the elements with a mark separating lithium, sodium, potassium, rubidium, cesium, beryllium, magnesium, calcium, strontium, barium, scandium, yttrium, lanthanum, titanium, zirconium, hafnium, vanadium, nobelium, tantalum, chromium, molybdenum, tungsten, manganese, technetium, rhenium, iron, ruthenium, osmium, cobalt, rhodium, iridium, nickel, palladium, platinum, copper, silver, gold, zinc, cadmium, mercury, aluminum, gallium, indium, thallium, germanium, tin, lead, antimony, bismuth, and polonium from hydrogen, boron, carbon, silicon, nitrogen, phosphorus, arsenic, oxygen, sulfur, selenium, tellurium, fluorine, chlorine, bromine, iodine, astatine, helium, neon, argon, krypton, xenon, and radon. In one embodiment, the fixed medium is a printed page. In a further embodiment, the printed page is laminated. Optionally, the printed page is on watermarked or proprietary paper.

In another embodiment, the fixed medium is electronic. In some preferred embodiments, the electronic fixed medium is selected from the group consisting of a computer monitor, a television monitor, a cell phone monitor, and a personal digital assistant monitor.

It is another object of the present invention to provide the chart for responding to a hazardous material emergency wherein the mark is a line drawn to separate lithium, sodium, potassium, rubidium, cesium, beryllium, magnesium, calcium, strontium, barium, scandium, yttrium, lanthanum, titanium, zirconium, hafnium, vanadium, nobelium, tantalum, chromium, molybdenum, tungsten, manganese, technetium, rhenium, iron, ruthenium, osmium, cobalt, rhodium, iridium, nickel, palladium, platinum, copper, silver, gold, zinc, cadmium, mercury, aluminum, gallium, indium, thallium, germanium, tin, lead, antimony, bismuth, and polonium from hydrogen, boron, carbon, silicon, nitrogen, phosphorus, arsenic, oxygen, sulfur, selenium, tellurium, fluorine, chlorine, bromine, iodine, astatine, helium, neon, argon, krypton, xenon, and radon on the periodic table of elements.

In one embodiment, the mark is contrasting backgrounds in squares on the periodic table of the elements separating lithium, sodium, potassium, rubidium, cesium, beryllium, magnesium, calcium, strontium, barium, scandium, yttrium, lanthanum, titanium, zirconium, hathium, vanadium, nobelium, tantalum, chromium, molybdenum, tungsten, manganese, technetium, rhenium, iron, ruthenium, osmium, cobalt, rhodium, iridium, nickel, palladium, platinum, copper, silver, gold, zinc, cadmium, mercury, aluminum, gallium, indium, thallium, germanium, tin, lead, antimony, bismuth, and polonium from hydrogen, boron, carbon, silicon, nitrogen, phosphorus, arsenic, oxygen, sulfur, selenium, tellurium, fluorine, chlorine, bromine, iodine, astatine, helium, neon, argon, krypton, xenon, and radon.

It is yet another object of the present invention to provide a chart for responding to a hazardous material emergency wherein a chart is in a fixed medium separating at least two elements selected from the group consisting of lithium, sodium, potassium, rubidium, cesium, beryllium, magnesium, calcium, strontium, barium, scandium, yttrium, lanthanum, titanium, zirconium, hafnium, vanadium, nobelium, tantalum, chromium, molybdenum, tungsten, manganese, technetium, rhenium, iron, ruthenium, osmium, cobalt, rhodium, iridium, nickel, palladium, platinum, copper, silver, gold, zinc, cadmium, mercury, aluminum, gallium, indium, thallium, germanium, tin, lead, antimony, bismuth, and polonium from at least two elements selected from the group consisting of hydrogen, boron, carbon, silicon, nitrogen, phosphorus, arsenic, oxygen, sulfur, selenium, tellurium, fluorine, chlorine, bromine, iodine, astatine, helium, neon, argon, krypton, xenon, and radon.

In one embodiment of the present invention, the chart consists of a list of at least two elements selected from the group consisting of lithium, sodium, potassium, rubidium, cesium, beryllium, magnesium, calcium, strontium, barium, scandium, yttrium, lanthanum, titanium, zirconium, hafnium, vanadium, nobelium, tantalum, chromium, molybdenum, tungsten, manganese, technetium, rhenium, iron, ruthenium, osmium, cobalt, rhodium, iridium, nickel, palladium, platinum, copper, silver, gold, zinc, cadmium, mercury, aluminum, gallium, indium, thallium, germanium, tin, lead, antimony, bismuth, and polonium.

In another embodiment of the present invention, the chart consists of a list of at least ten elements selected from the group consisting of lithium, sodium, potassium, rubidium, cesium, beryllium, magnesium, calcium, strontium, barium, scandium, yttrium, lanthanum, titanium, zirconium, hafnium, vanadium, nobelium, tantalum, chromium, molybdenum, tungsten, manganese, technetium, rhenium, iron, ruthenium, osmium, cobalt, rhodium, iridium, nickel, palladium, platinum, copper, silver, gold, zinc, cadmium, mercury, aluminum, gallium, indium, thallium, germanium, tin, lead, antimony, bismuth, and polonium.

In yet another embodiment of the present invention, the chart consists of a list of at least twenty elements selected from the group consisting of lithium, sodium, potassium, rubidium, cesium, beryllium, magnesium, calcium, strontium, barium, scandium, yttrium, lanthanum, titanium, zirconium, hafnium, vanadium, nobelium, tantalum, chromium, molybdenum, tungsten, manganese, technetium, rhenium, iron, ruthenium, osmium, cobalt, rhodium, iridium, nickel, palladium, platinum, copper, silver, gold, zinc, cadmium, mercury, aluminum, gallium, indium, thallium, germanium, tin, lead, antimony, bismuth, and polonium.

In yet another embodiment of the present invention, the chart consists of a list of elements selected from the group consisting of lithium, sodium, potassium, rubidium, cesium, beryllium, magnesium, calcium, strontium, barium, scandium, yttrium, lanthanum, titanium, zirconium, hafnium, vanadium, nobelium, tantalum, chromium, molybdenum, tungsten, manganese, technetium, rhenium, iron, ruthenium, osmium, cobalt, rhodium, iridium, nickel, palladium, platinum, copper, silver, gold, zinc, cadmium, mercury, aluminum, gallium, indium, thallium, germanium, tin, lead, antimony, bismuth, and polonium.

In yet another embodiment of the present invention, the chart consists of a list of at least two elements selected from the group consisting of hydrogen, boron, carbon, silicon, nitrogen, phosphorus, arsenic, oxygen, sulfur, selenium, tellurium, fluorine, chlorine, bromine, iodine, astatine, helium, neon, argon, krypton, xenon, and radon.

In another embodiment, the chart consists of a list of at least ten elements selected from the group consisting of hydrogen, boron, carbon, silicon, nitrogen, phosphorus, arsenic, oxygen, sulfur, selenium, tellurium, fluorine, chlorine, bromine, iodine, astatine, helium, neon, argon, krypton, xenon, and radon.

In yet another embodiment, the chart consists of a list of elements selected from the group consisting of hydrogen, boron, carbon, silicon, nitrogen, phosphorus, arsenic, oxygen, sulfur, selenium, tellurium, fluorine, chlorine, bromine, iodine, astatine, helium, neon, argon, krypton, xenon, and radon.

DETAILED DESCRIPTION OF THE INVENTION

Before the present methods are described, it is understood that this invention is not limited to the particular methodology, protocols, and reagents described, as these may vary. It also is to be understood that the terminology used herein is for the purpose of describing particular embodiments only, and is not intended to limit the scope of the present invention that will be limited only by the appended claims.

Definitions

For the purposes of promoting an understanding of the embodiments described herein, reference will be made to preferred embodiments and specific language will be used to describe the same. The terminology used herein is for the purpose of describing particular embodiments only, and is not intended to limit the scope of the present invention. As used throughout this disclosure, the singular forms "a," "an," and "the" include plural reference unless the context clearly dictates otherwise. Thus, for example, a reference to "a chemical" includes a plurality of such chemicals, as well as a single chemical.

As used herein, the following acronyms have the following meanings: LEL for Lower Explosive Limit; UEL for Upper Explosive Limit; Fl.P for Flash Point; IDLH for Immediately Dangerous to Life and Health; IP for Ionization Potential; MW for Molecular weight; HazMat for Hazardous Materials; and ER for Exposure Routes.

The explosive limit of a gas or a vapor, is the limiting concentration (in air) that is needed for the gas to ignite and explode. There are two explosive limits for any gas or vapor: the lower explosive limit (LEL) and the upper explosive limit (UEL). At concentrations in air below the LEL, there is not enough fuel to continue an explosion; at concentrations above the UEL, the fuel to air ratio is too rich to trigger an explosion.

Personal Protection Equipment (PPE) is used by HazMat responders when they are called to respond to a HazMat emergency. There are three levels of PPE commonly used by HazMat responders: Turnout gear, Level A, and Level B. Turnout gear is equipment usually used by firefighters when responding to a fire. Turnout gear generally includes a fire protective jacket and pants as well as a helmet. Level A is used when the greatest level of skin, respiratory, and eye protection is required. Level A equipment may include, but is not limited to, the following: a positive pressure, full face-piece self-contained breathing apparatus (SCBA), or positive pressure supplied air respirator with escape SCBA; a totally-encapsulating chemical-protective suit including coveralls, long underwear, gloves and boots; a hard hat and optionally a disposable protective suit, gloves and boots, which may be worn over totally-encapsulating suit. Level B provides the highest level of respiratory protection, but a lesser level of skin protection. Level B equipment may include, but is not limited to, the following: a positive pressure, full face-piece self-contained breathing apparatus (SCBA), or positive pressure supplied air respirator with escape SCBA; hooded chemical-resistant clothing including overalls and long-sleeved jacket; coveralls; one or two-piece chemical-splash suit; and optionally disposable chemical-resistant overalls; gloves; boots; boot-covers; a hard hat and face shield.

The HazMat Response System

Figure 1:
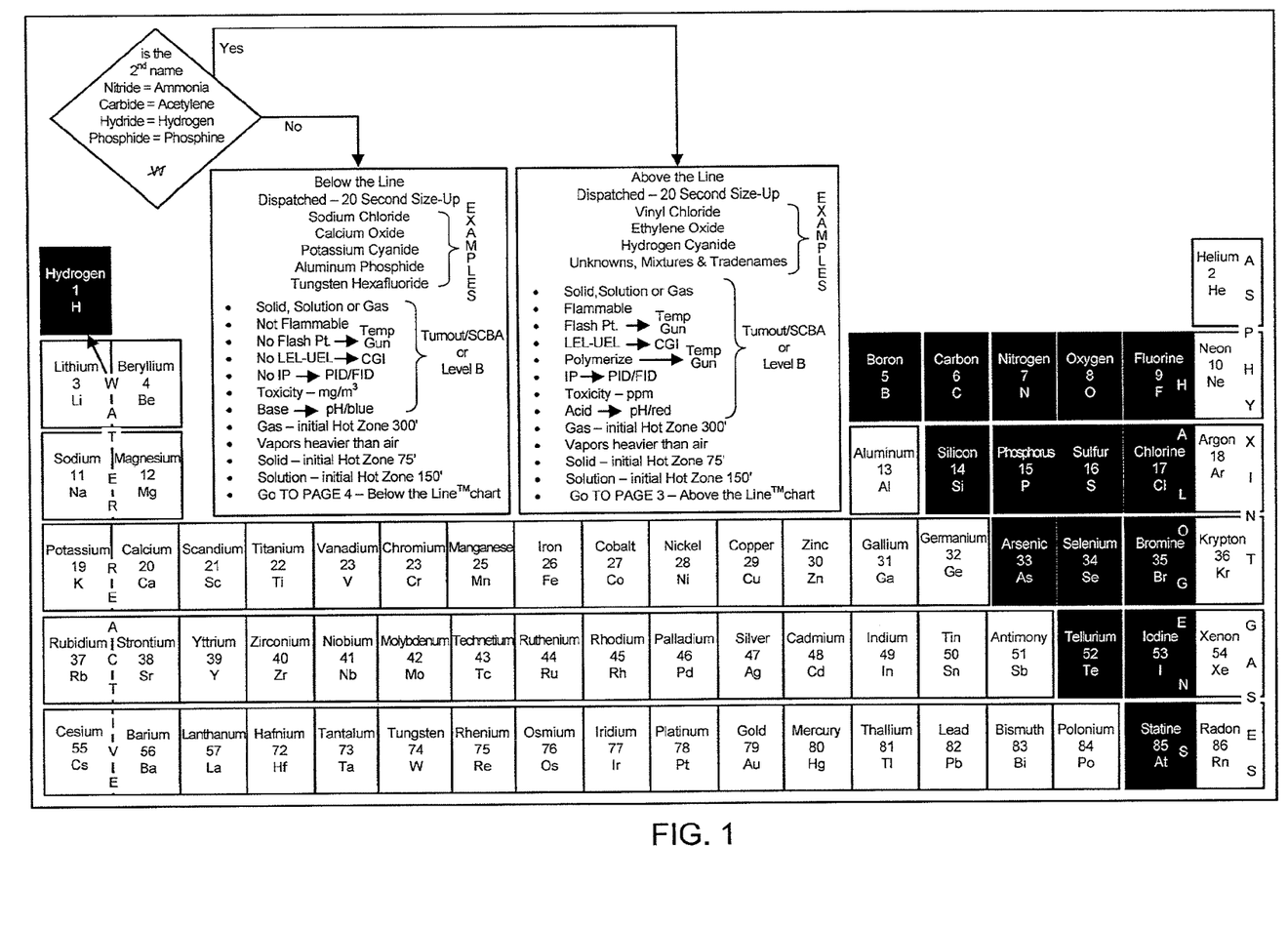
FIG. 1 provides an illustration of an embodiment of the hazardous material response method of the invention in four steps.

FIG. 1 shows a schematic summarizing how the HazMat Response System of the invention works. If the chemical name of the material being analyzed is known, then the system is used as represented from the left side of the schematic. If not, it is begun at the right side of the schematic. We first describe how the HazMat Response System works when the chemical name is known.

Figure 2:
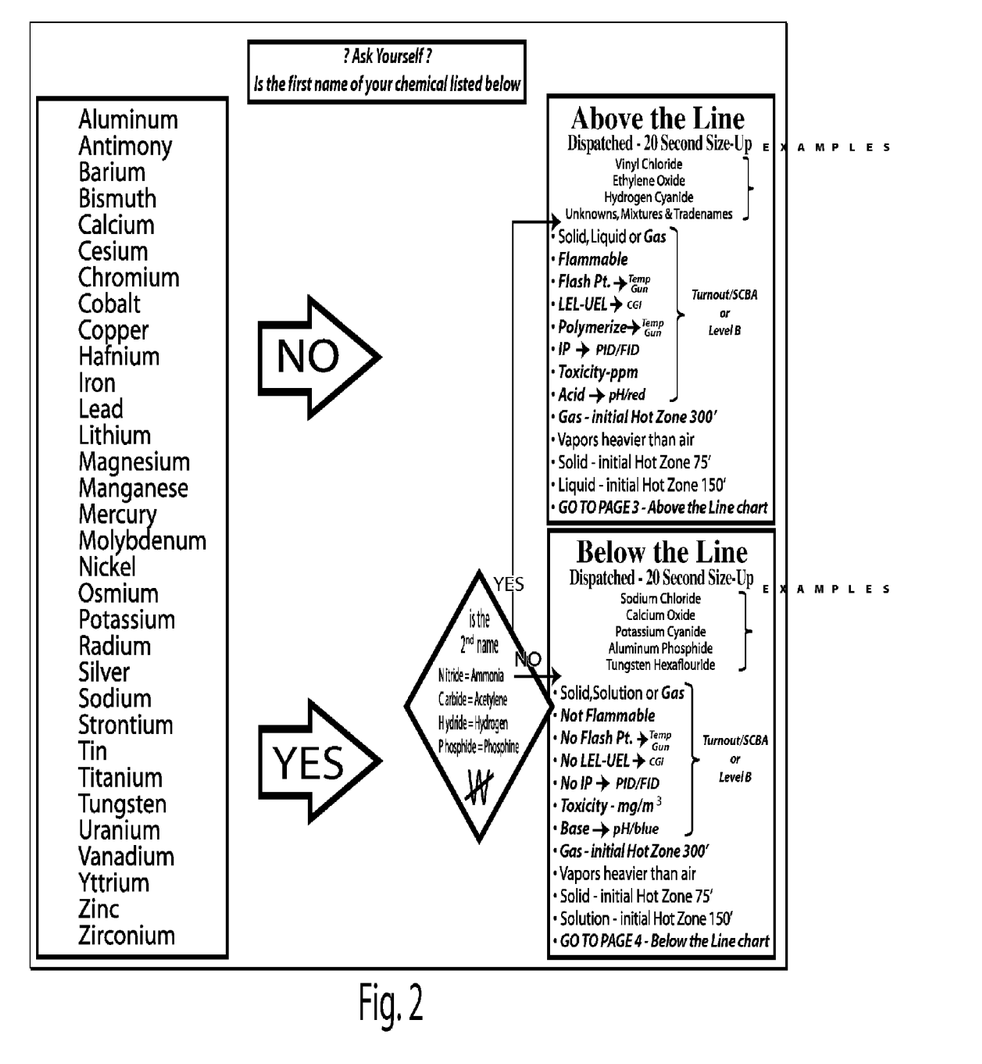
FIG. 2 shows a chart indicating which elements and chemical moieties are "above the line" or "below the line".
Figure 3:
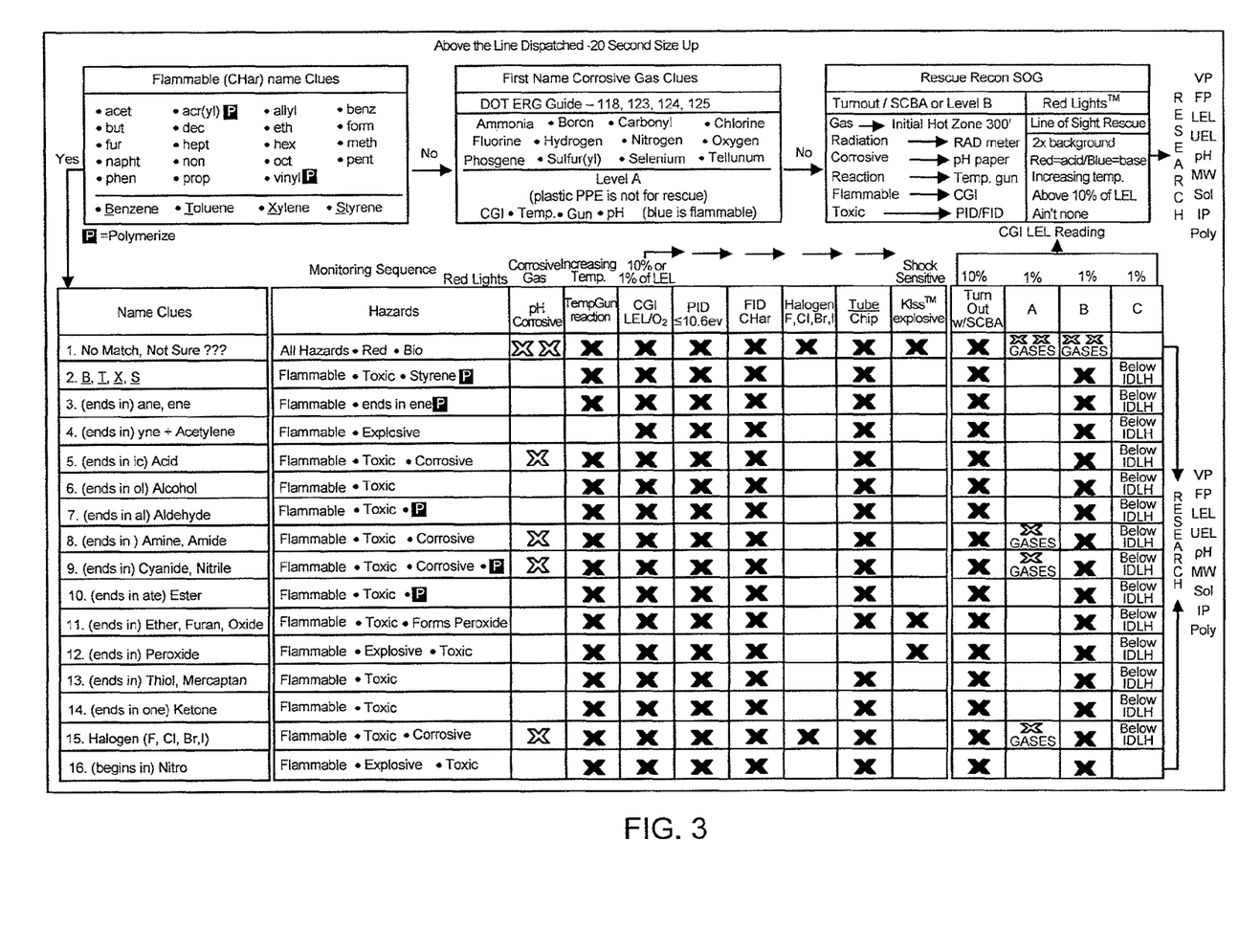
FIG. 3 shows a chart indicating which elements and chemical moieties are "above the line" or "below the line".

As shown in FIG. 1, the first step is to use the information conveyed by the proprietary "Smart Chart" of the HazMat Response System of the invention. (FIG. 2). In one embodiment, this information is contained in the "Smart Chart" as shown in FIG. 2. In other embodiments, this information is contained in other fixed media allowing a HazMat responder to quickly determine at the scene of a HazMat emergency if the material is "above the line" or "below the line". An example of one other such fixed medium is shown in FIG. 3. These fixed media are also able to be used electronically. Thus, these representations of elements and chemical moieties being above and below the line are also shown on computer, cell phone or personal digital assistant (PDA). These fixed media need not separate all of the listed elements into two groups. In some embodiments of the invention, only the most commonly encountered elements and/or chemical moieties need to be represented in the fixed medium. The fixed medium may list any number of elements from two elements or fixed moieties to all of them. Examples of numbers of elements of moieties represented include 2, 5, 10, 15, 20, 25, 50, 60, 70, 80, 90 and 100.

The "line" is indicated on the periodic table of elements shown in FIG. 2. The materials with elements in their first names, shown below the heavy marking, are considered "below the line". Also materials that have one of the four chemical moieties in the "water reactive diamond" above the periodic table of elements in their second name are also considered "below the line". The elements that are considered "below the line" are lithium, sodium, potassium, rubidium, cesium, beryllium, magnesium, calcium, strontium, barium, scandium, yttrium, lanthanum, titanium, zirconium, hafnium, vanadium, nobelium, tantalum, chromium, molybdenum, tungsten, manganese, technetium, rhenium, iron, ruthenium, osmium, cobalt, rhodium, iridium, nickel, palladium, platinum, copper, silver, gold, zinc, cadmium, mercury, aluminum, gallium, indium, thallium, germanium, tin, lead, antimony, bismuth, and polonium. The chemical moieties that are considered "below the line" are nitride (ammonia), carbide (acetylene), hydride (hydrogen) and phosphide (phosphine). Materials that are classified as "below the line" include those that, generally, are solid at room temperature, are non-flammable, have no LEL or UEL, have no flashpoint, no ionizing potential, and are bases. For these materials, the units used to measure their exposure limits, e.g. their immediately dangerous to life and health (IDLH) level or permissible exposure limits (PELs), are $mg/m^3$. The materials with elements in their first name, shown not to be below the heavy marking, are considered "above the line". The elements that are considered "above the line" are hydrogen, boron, carbon, silicon, nitrogen, phosphorus, arsenic, oxygen, sulfur, selenium, tellurium, fluorine, chlorine, bromine, iodine, astatine, helium, neon, argon, krypton, xenon, and radon. Materials that are classified as "above the line" include those that are liquids or gases, are flammable, have LEL and UEL, have a flashpoint, have an ionizing potential and are acids. For these materials, the units used to measure their exposure limits, e.g. their immediately dangerous to life and health (IDLH) level or permissible exposure limits (PELs), are parts per million (ppm).

Based on the information provided by a material being classified as above or below the line, personnel responding to a HazMat situation can quickly determine the initial PPE necessary for the material. If a material is classified as "above the line", turn out/SCBA or Level A PPE is generally necessary. If a material is classified as "below the line", a turn out/SCBA or Level B PPE is generally necessary. Moreover, the initial isolation zone for a material classified as "below the line" is generally a 75 foot radius if a solid and a 150 foot radius if a liquid, while a material classified as "above the line" generally has an initial isolation zone of a 150 foot radius if it is a liquid and of 300 foot if it is a gas.

Figure 4:
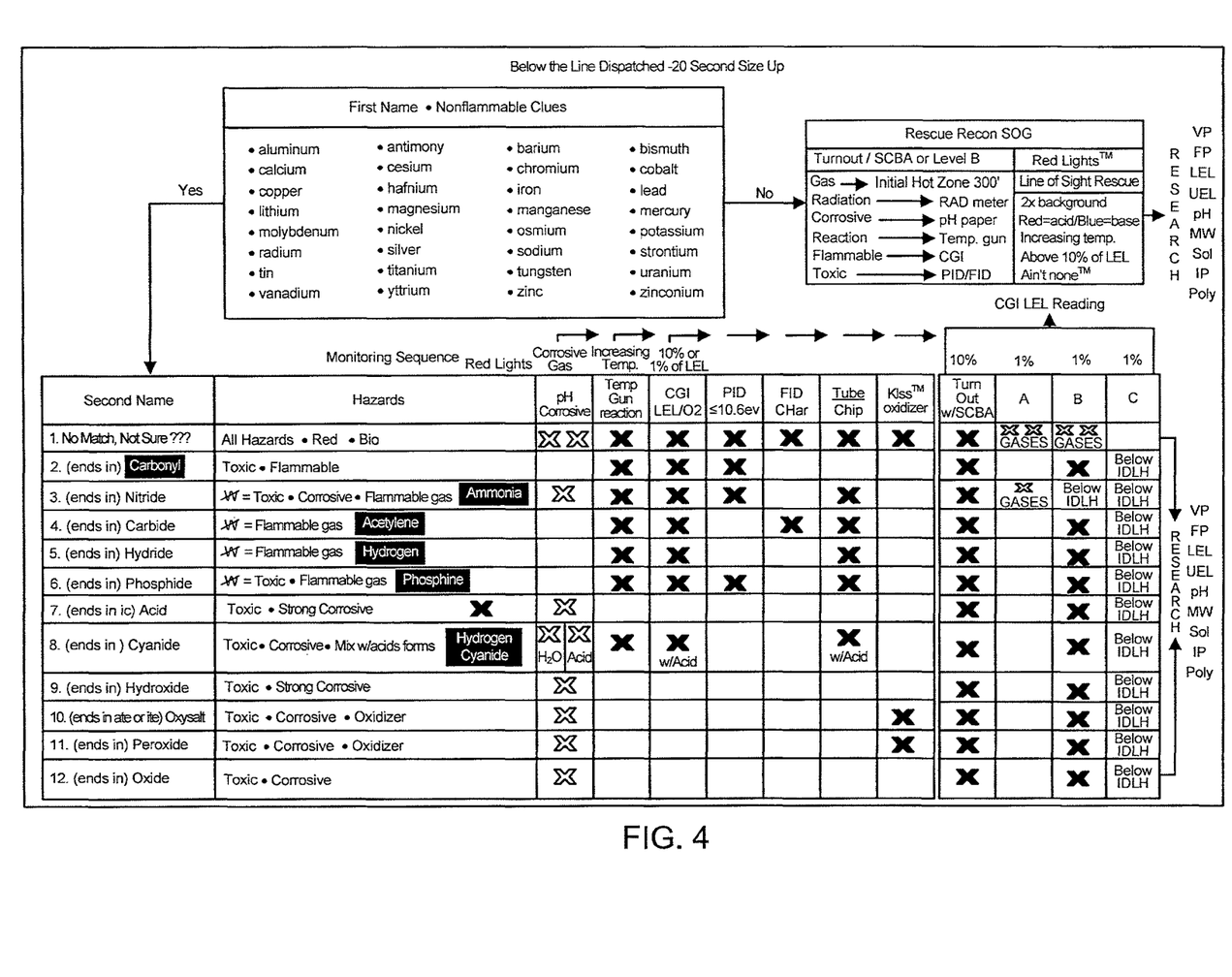
FIG. 4 shows a chart indicating potential hazards and appropriate tests for hazardous materials based upon the second word in the hazardous material name for hazardous materials classified as "above the line".
Figure 5:
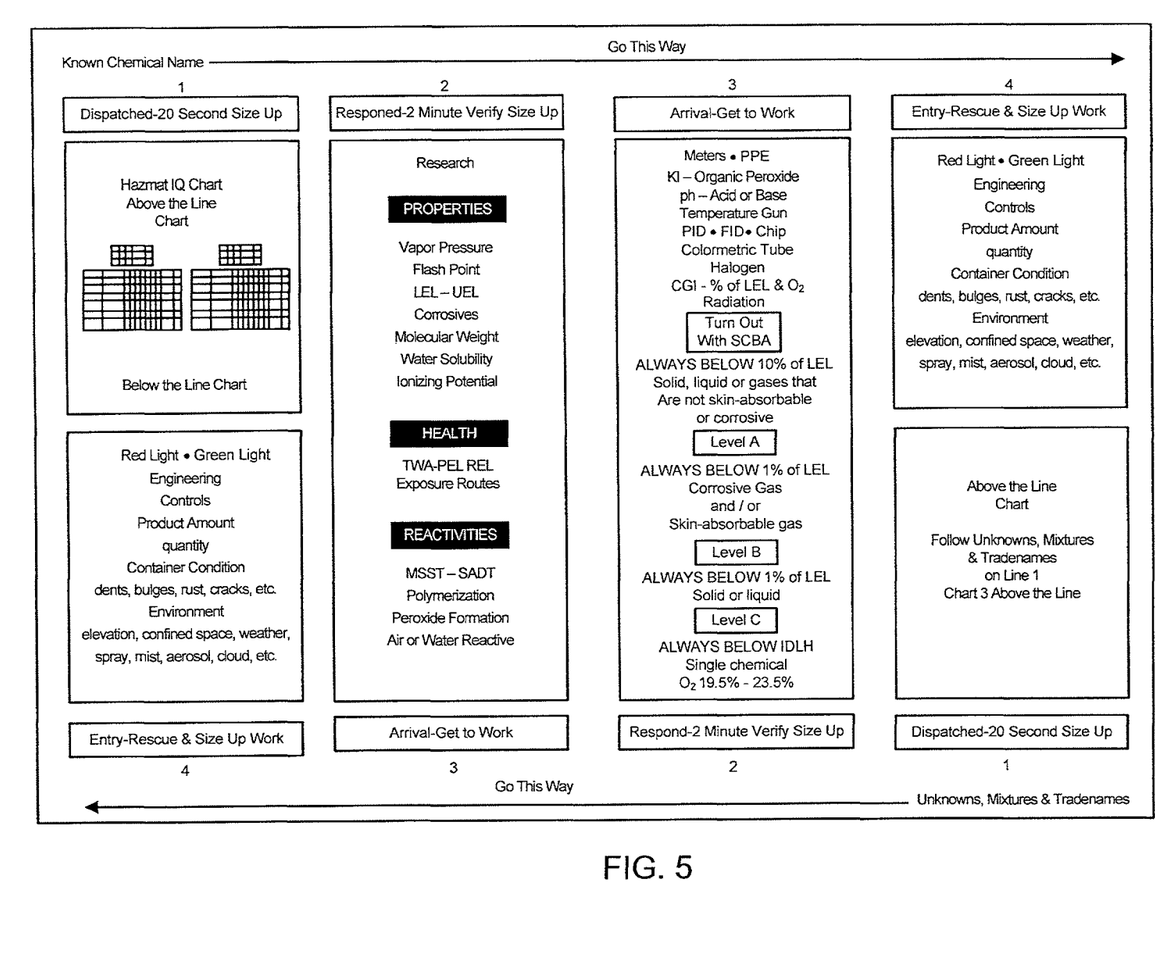
FIG. 5 shows a chart indicating potential hazards and appropriate tests for hazardous materials based upon the second word in the hazardous material name for hazardous materials classified as "below the line".
Figure 6:
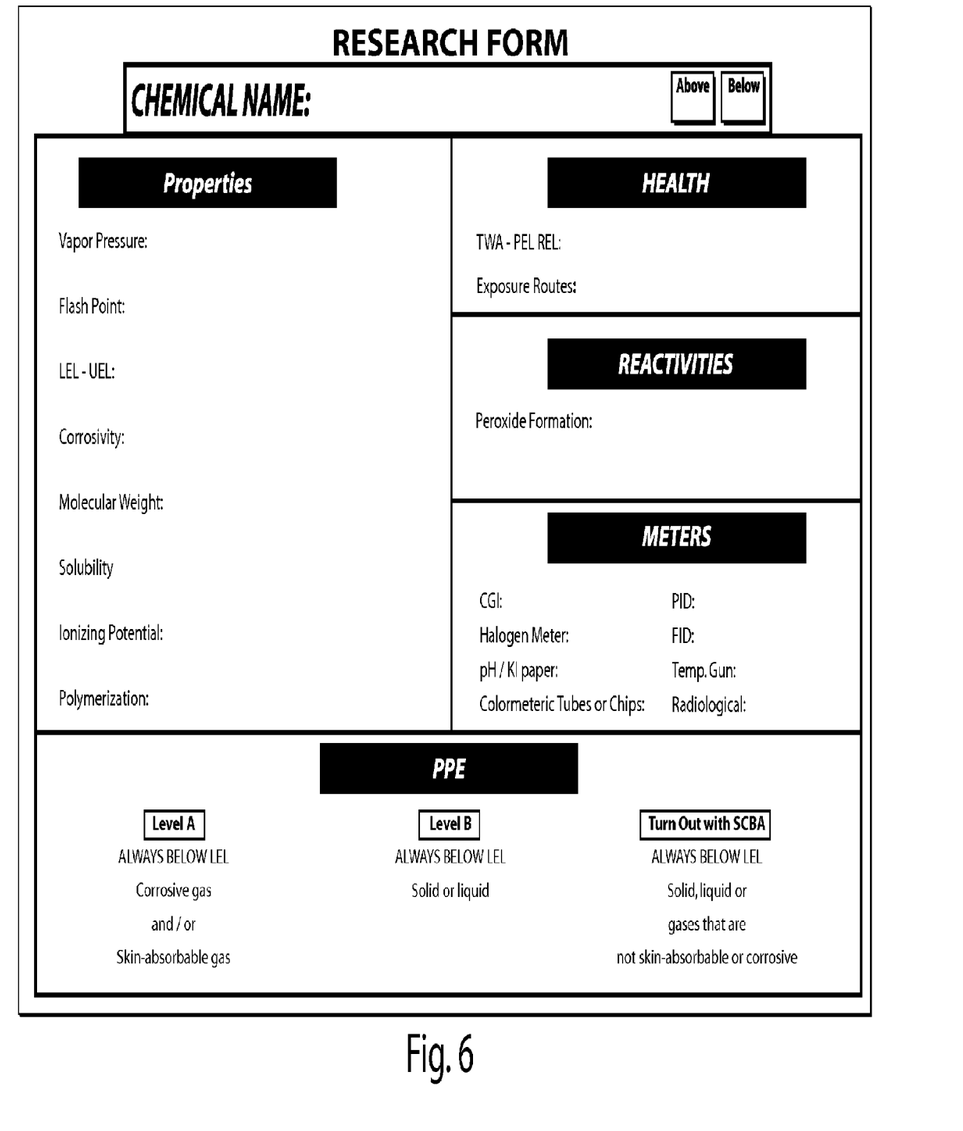
FIG. 6 shows a research form providing a framework to capture critical properties and characteristics found in other documentation.

Additional information can then be acquired to deal with the hazardous material after a perimeter has been created. For example, for materials classified as "above the line", additional tests can be performed based on the ending of the second name of the material. FIG. 4 shows detection equipment that is used to detect the concentration of hazardous material and the associated hazard. These tests include potassium iodide (KI) tests to detect oxidizers, tests of pH, tests for toxic industrial chemicals (TIC), tests involving photoionization detectors (PID), flame ionization detectors (FID), tube chips used to detect various hazards, and combustible gas indicators (CGI). For materials classified as "below the line", different tests can be performed based on the ending of the second name of the material. FIG. 5 shows tests that are used to detect the concentration of hazardous material and the associated hazard.

In other embodiments of the HazMat Response System of the invention, a four step system can be used in reverse if the name of the compound is not known. Upon entering the site of a HazMat emergency, a HazMat responder may not know what the hazardous material is, and whether the hazardous material is above or below the line. Because of the differences between hazardous materials that are above or below the line, a HazMat responder can perform any one of a number of simple tests to determine the salient hazards. If the HazMat is a solid then turn out/SCBA or Level B PPE should be used to protect HazMat responder personnel, whereas with a gas or liquid, turn out/SCBA or Level A PPE is used. The tests shown above in FIGS. 3 and 4 can be used to ascertain what hazardous material is present and what sort of response should be made to the hazardous material.

The invention also provides methods of training HazMat responders to use the HazMat Response System of the invention. The training includes familiarizing HazMat responders with the fixed media that are used to quickly ascertain whether a hazardous material is "above" or "below the line". This familiarization is performed by providing for the HazMat responders to be trained a copy of one or more fixed media used to quickly ascertain whether a hazardous material is "above" or "below the line" and instructing them how to use the media. These fixed media can be any of those described herein, including representations as shown in FIGS. 2 and 3. The training further includes familiarizing HazMat responders with fixed media showing selected physical properties of hazardous materials and tests that should be performed to characterize the threat posed by these materials. Examples of such fixed media are shown in FIGS. 4 and 5, herein.

EXAMPLES

Example 1

Determination of Hazard Information for Hazardous Materials

The HazMat Response System of the invention is used to respond to any hazardous material. Below, example of various materials and how the system directs a response to them are shown.

Calcium oxide would be considered "below the line" using the HazMat response system of the invention, because the name "calcium" is in the first name of the material and it is below the line as described above. This shows to a HazMat responder that this material is a solid, it is not flammable, it has no LEL/UEL, it has no flashpoint or ionization potential, it is a base, the IDLH or PEL is measured in $mg/m^3$ and that the initial isolation is 75 feet. Based on having "oxide" in the second name of the material, the HazMat responder would also know to test pH because the material generally acts as a weak base. (FIG. 4). The HazMat responder would also know to use a PPE of turn out/SCBA or Level B.

Potassium cyanide would also be considered "below the line" using the HazMat response system of the invention, because the name "potassium" is in the first name of the material. As above, for calcium oxide, this shows to a HazMat responder that this material is a solid, it is not flammable, it has no LEL, it has no flashpoint or ionization potential, it is a base, the IDLH or PEL is measured in $mg/m^3$ and that the initial isolation is 75 feet. Based on having "cyanide" in the second name of the material, the HazMat responder would also know to test pH, test with a tube or chip and CGI to determine the amount of potassium cyanide present because of the toxicity of the substance. (FIG. 4). The HazMat responder would also know to use turn out/SCBA or Level B PPE.

Vinyl chloride would be considered to be "above the line" using the HazMat response system of the invention, because the name "vinyl" is not one of the names present "below the line". The HazMat response system of the invention shows to a HazMat responder that this material is a liquid or gas, it is flammable, it has an LEL and UEL, it has a flashpoint and ionization potential to consider, it is an acid, the IDLH or PEL is measured in ppm and that the initial isolation is 150 feet if a liquid and 300 feet if a gas. Based on having "chloride" in the second name of the material, the HazMat responder would also know to test with a temperature gun, pH paper, a PID, an FID, a tube chip and a CGI to acquire a concentration of the material because it has the potential to be toxic, flammable and corrosive. (FIG. 3). The HazMat responder would also know to use a turnout/SCBA or Level A PPE (below 1% of LEL).

Ethylene oxide would also be considered to be "above the line" using the HazMat response system of the invention, because the name "ethlyene" is not one of the names present "below the line". The HazMat response system of the invention shows to a HazMat responder that this material, like vinyl chloride, is a liquid or gas, it is flammable, it has an LEL and UEL to consider, it has a flashpoint and ionization potential to consider, it is an acid, the IDLH or PEL is measured in ppm and that the initial isolation is 150 feet if a liquid and 300 feet if a gas. Based on having "oxide" in the second name of the material, the HazMat responder would also know to test with a temperature gun, a PID, an FID, a tube or chip and a CGI to acquire a concentration of the material to because it has the potential to be flammable. (FIG. 3). The HazMat responder would also know to use turnout/SCBA or Level B PPE (below 1% of LEL).

Hydrogen cyanide would also be considered to be "above the line" using the HazMat response system of the invention, because the name "hydrogen" is not one of the names present "below the line". The HazMat response system of the invention shows to a HazMat responder that this material, like vinyl chloride, is a liquid or gas, it is flammable, it has an LEL and UEL to consider, it has a flashpoint and ionization potential to consider, it is an acid, the IDLH or PEL is measured in ppm and that the initial isolation is 150 feet if a liquid and 300 feet if a gas. Based on having "cyanide" in the second name of the material, the HazMat responder would also know to test for pH and with a temperature gun, a PID, an FID, a tube or chip and a CGI to acquire a concentration of the material to because it has the potential to be toxic, corrosive and flammable. (FIG. 3). The HazMat responder would also know to use turnout/SCBA or Level A PPE if corrosive gas and below 1% of LEL.

We claim:

1. A method of responding to a hazardous material emergency comprising:
   performing a test for the presence or absence of at least one physical property of a hazardous material involved in the hazardous material emergency, wherein the test is selected from the group consisting of flammability, existence of explosive limits, existence of flashpoint, existence of ionizing potential, and acidic or basic pH;
   determining a required protective equipment for responding to the hazardous material emergency, the determining comprising a) if the test shows that the hazardous material is flammable, has explosive limits, has a flashpoint, has an ionization potential or is acidic, identifying turnout/self contained breathing apparatus (SCBA) or Level A personal protection equipment (PPE) as the required protective equipment, and b) if the test shows that the hazardous material is not flammable, has no explosive limits, has no flashpoint, has no ionization potential or is basic, identifying turnout/SCBA or Level B PPE as the required protective equipment; and
   equipping a hazardous material responder with the required protective equipment for responding to the hazardous material emergency.

2. The method of claim 1, wherein the test for the presence or absence of the at least one physical property is a test that shows if the hazardous material is flammable.

3. The method of claim 1, wherein the test for the presence or absence of the at least one physical property is a test that shows if the hazardous material has explosive limits.

4. The method of claim 1, wherein the test for the presence or absence of the at least one physical property is a test that shows if the hazardous material has a flashpoint.

5. The method of claim 1, wherein the test for the presence or absence of the at least one physical property is a test that shows if the pH of the hazardous material.

6. The method of claim 1, wherein the test for the presence or absence of the at least one physical property is a test that shows if the hazardous material has an ionizing potential.

\* \* \* \* \*